May 19, 1959

E. A. MOSES 2,886,906

GROUND LEVELING IMPLEMENT

Filed July 26, 1956

ELMER A. MOSES
INVENTOR.

BY G. Lorenze Miller
ATTORNEY

May 19, 1959 E. A. MOSES 2,886,906
GROUND LEVELING IMPLEMENT
Filed July 26, 1956 4 Sheets-Sheet 2
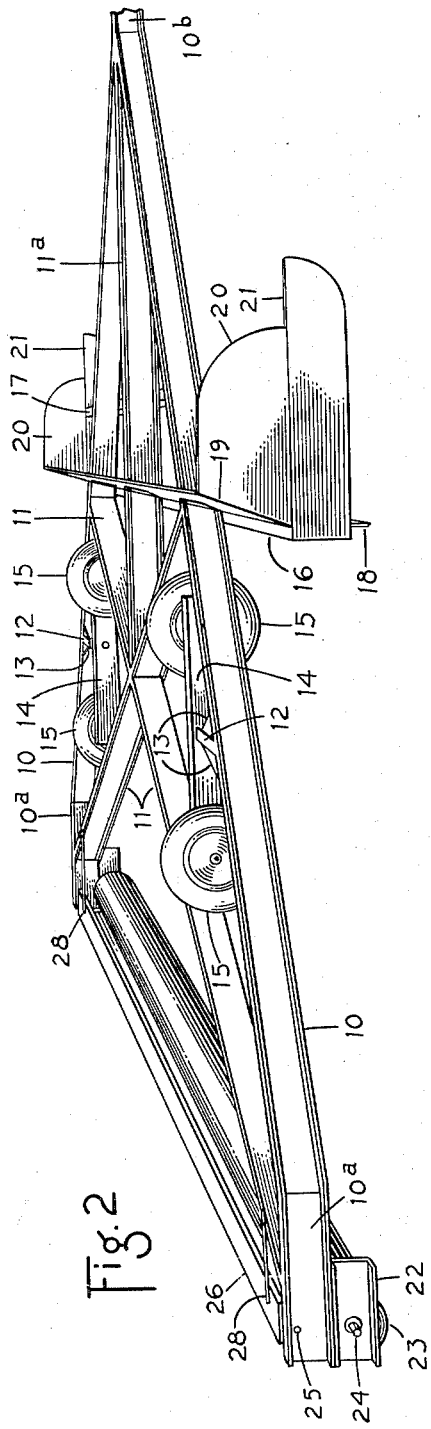
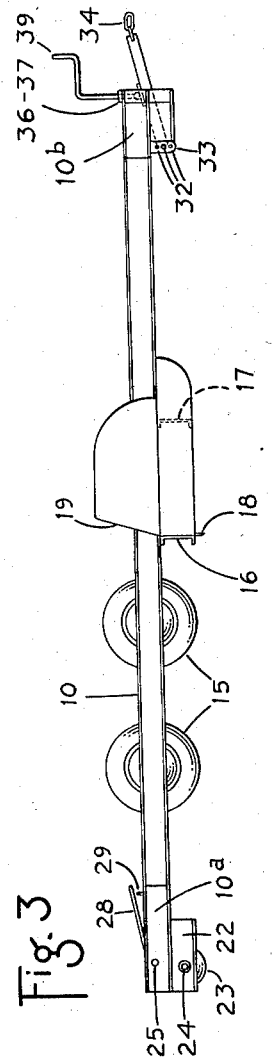
ELMER A. MOSES
INVENTOR.
BY
ATTORNEY May 19, 1959  E. A. MOSES  2,886,906
GROUND LEVELING IMPLEMENT
Filed July 26, 1956 4 Sheets-Sheet 3
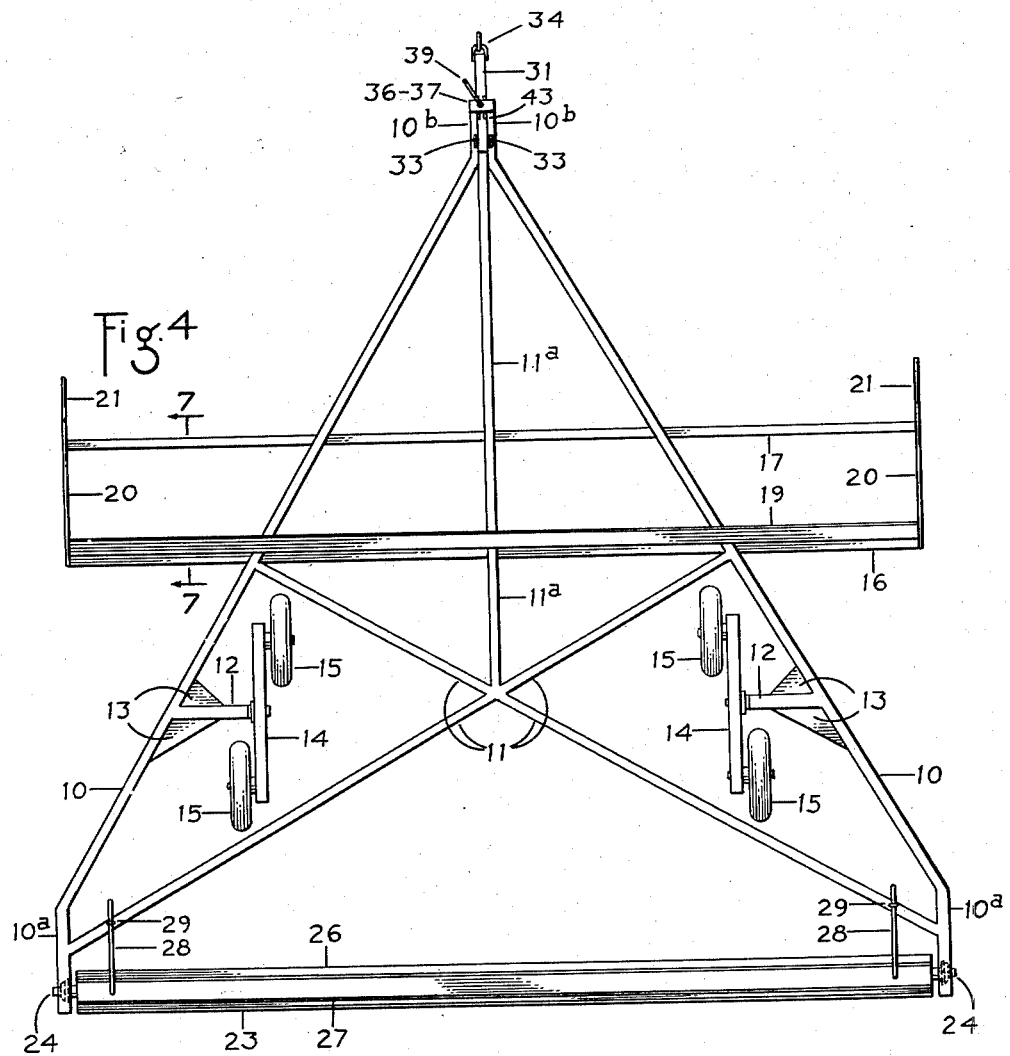
ELMER A. MOSES
INVENTOR.
BY G. Lorenzo Miller
ATTORNEY

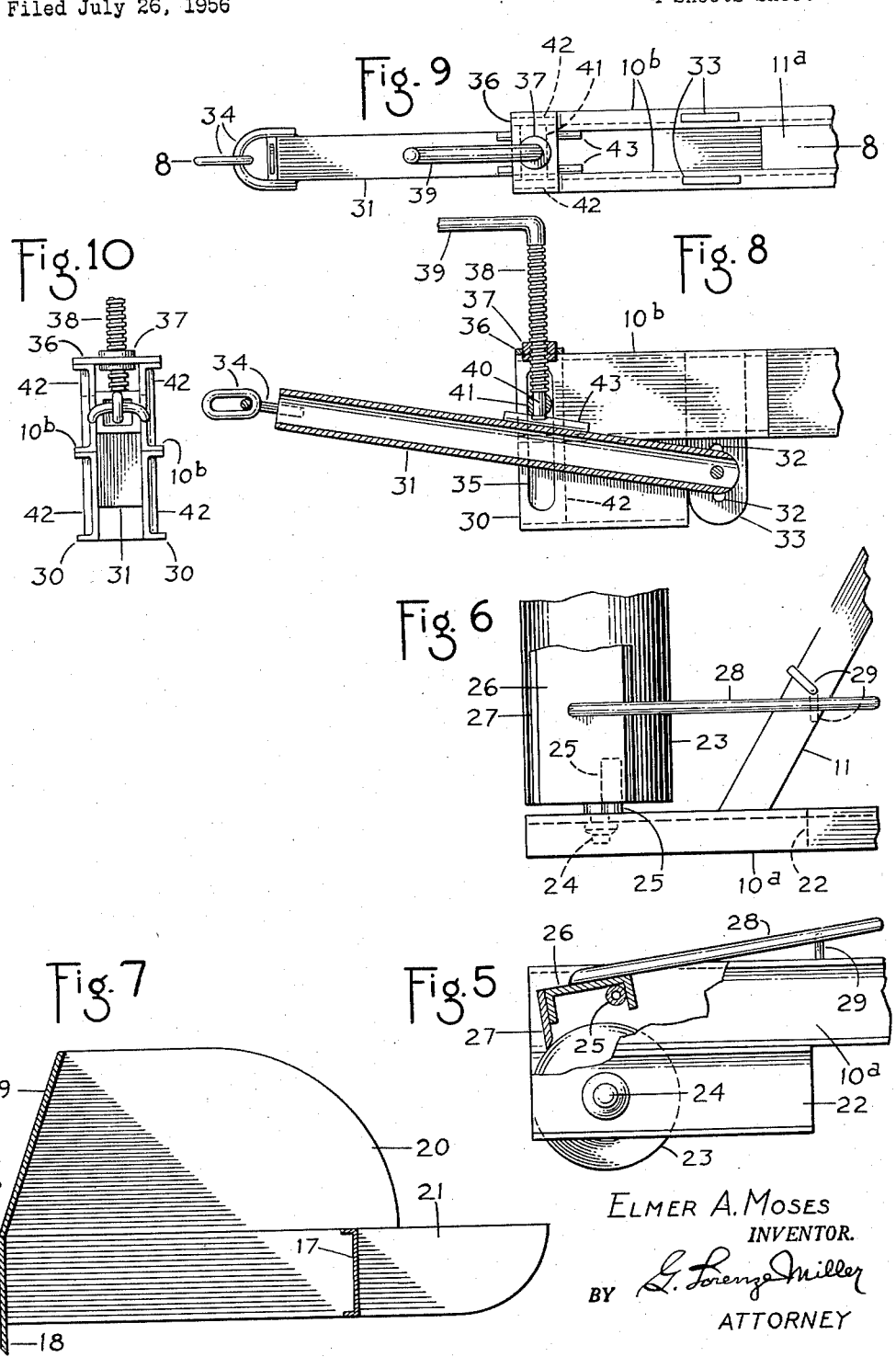

United States Patent Office 2,886,906
Patented May 19, 1959

2,886,906
GROUND LEVELING IMPLEMENT

Elmer A. Moses, Pawnee, Ill.

Application July 26, 1956, Serial No. 600,225

9 Claims. (Cl. 37—146)

This invention relates to a ground leveling implement.

The invention is more particularly concerned with a novel implement adapted for use on fields in which farm crops are to be planted and in which fields it is essential that the ground be as nearly perfectly level as possible in order to facilitate the maximum performance of machines, such as combines and other agricultural equipment for crop harvesting.

It is well known by farmers that in fields wherein there are both ridges and hollows, the harvesting machines are not only subject to undue hard wear, but are not capable of making a clean job of harvesting, with the result that measurable quantities of grain are not picked up by the machine and accordingly go to waste.

It is accordingly a primary object of this invention to provide a ground leveling implement whereby upon the use of which, the above noted disadvantages attendant to rough and uneven ground intended for crop planting are wholly overcome.

A further object of the invention is the provision of a ground leveling implement, which, while being of relatively simple and durable construction, is highly efficient in use.

Other objects and advantages of the invention will become apparent in the course of the following detailed description, taken in connection with the accompanying drawings, wherein—

Fig. 2 is a perspective view of the implement as observed from the right hand side thereof.

Fig. 3 is a right hand side elevational view of the implement.

Fig. 4 is a top plan view of the implement.

Fig. 5 is an enlarged detail view of the right or rear end of the implement, as shown in Figs. 2 and 3, partly broken away and in section.

Fig. 6 is a fragmental top plan view of the detail structure of Fig. 5.

Fig. 7 is an enlarged detail sectional view as observed in the plane of line 7—7 on Fig. 4.

Fig. 8 is an enlarged vertical sectional view of the front end of the implemenet as observed in the plane of line 8—8 on Fig. 9.

Fig. 9 is a top plan view of the structure of Fig. 8.

Fig. 10 is a broken front elevational view of the structure of Fig. 8.

Figure 1:
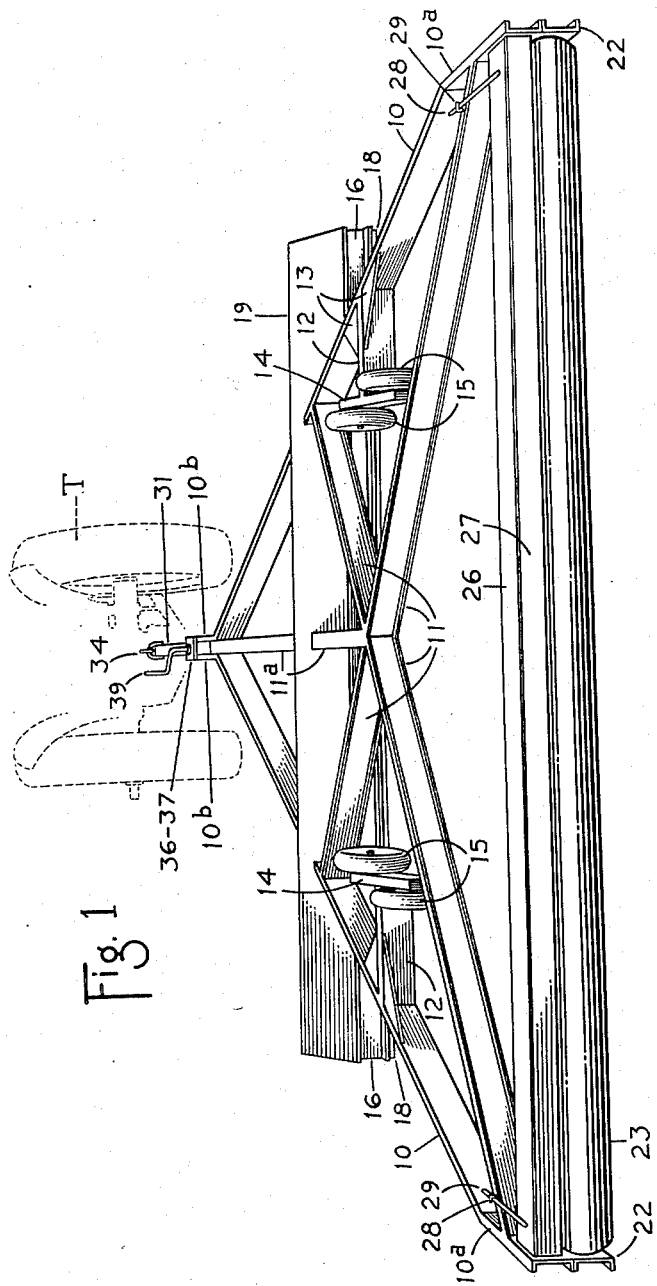
Fig. 1 is a perspective view of the improved implement, as observed from the rear thereof.

Referring now in detail to the drawings, the improved implement will be seen to comprise a main frame of generally triangular form in plan with its base at the rear and apex at the front. The frame comprises opposite side members 10 which converge from the rear to the front and which are preferably of channel iron construction. The converging side members 10 do, however, include relatively short parallel rear end portions 10$^a$. The frame further comprises intersecting frame members 11 also preferably of channel iron construction with the rear ends thereof connected to the side frame portions 10$^a$ and the front ends thereof connected to the converging members 10 intermediate the ends thereof.

The frame further comprises a frame member 11$^a$ preferably of channel iron construction which is disposed in the longitudinal central vertical plane of the frame and which extends from the intersection of frame members 11 to the front end of the frame and at which point diverging frame members 10 terminate in relatively short portions 10$^b$ parallel with and abutting the front end of frame member 11$^a$.

Each side frame member 10 is provided with a stub axle 12 projecting inwardly in transverse alignment and perpendicular to the central longitudinal plane of the frame.

The axles are preferably disposed within the intersecting frame members 11, one at each side of the point of intersection and reinforcing members 13 are connected with the side frame members 10 and the axles 12.

Rotatably supported intermediate its ends on the end of each axle 12 is a rocker arm 14 and a ground engageable wheel 15 is rotatably supported on each end of each rocker arm, thereby providing a pair of tandem supporting wheels at each side of the frame. Disposed beneath the main frame and extending laterally outwardly from the frame side members 10 are a pair of parallel channel iron members 16 and 17 which are secured to the main frame. The said members 16 and 17 are in spaced relation longitudinally of the frame and are disposed between the intersecting frame members 11 and the front end of the main frame.

The channel iron member 17 functions as an advance scraping element and secured to the forward face of the rear channel member 16 is a ground scraping blade 18 whose scraping edge is disposed below the lower edge of the member 16.

An upwardly extending and forwardly inclined apron 19 has the lower edge thereof suitable secured to member 16 and such apron serves to prevent ground from overflowing the scraper blade.

Furthermore, upper and lower side wings 20 and 21 are suitably secured to the opposite ends of the channel irons 16 and 17 for preventing side spill of ground.

A relatively short channel iron member 22 is disposed beneath each portion 10$^a$ of the main frame and suitably secured thereto.

A roller 23 is disposed between members 22 and same is provided with an axle 24 rotatably supported in said members 22.

Supported in each of the main frame portions 10$^a$ is a bearing member 25 which members are axially alined transversely of the frame and on which bearing memers is pivotally supported a channel iron cleaner blade mount 26 and to whose rear side is secured a roller cleaning blade 27.

As will be particularly observed from Fig. 5, the mount 26 is pivotally supported adjacent its forward edge whereby the rear edge thereof gravitates downwardly with a resulting operative engagement of the blade 27 with the roller 23.

In order to raise the cleaning blade 27 from engagement with the roller 23 as in transit of the implement, the mount 26 is provided adjacent each end thereof with an elongated handle 28 and the forward ends of such handles are engageable under turnable hooks 29 supported in frame member 11 for retaining the front ends of the handles depressed and with the blade 27 in elevated position out of contact with the roller 23.

At the front end of the frame a relatively short channel iron member 30 is disposed beneath each frame end portion 10$^b$ thereby providing a relatively deep channel in which is disposed a tongue member 31 whose rear end is pivotally connected in any one of the three vertically aligned openings 32 in a pair of laterally disposed wing members 33 which are secured to and depend from the said frame portions 10$^b$.

The tongue member 31 is of rectangular cross section and the forward end thereof is provided with suitable means 34 for connection with a tractor T (Fig. 1).

The frame portions 10b and the members 30 are jointly provided with vertical slots 35.

A plate 36 extends across the tops of frame portions 10b adjacent the front ends thereof and is provided with an internally threaded bushing 37 in which is threaded the shank 38 of an adjusting screw which is provided with a manipulating handle 39. The lower end of the screw shank 38 is in the form of a smooth portion 40 which extends through an elongated cylindrical cushion member 41 intermediate the ends thereof, the said portion 40 being headed over for retention of the cushion member.

The opposite ends of the cushion member ride in said slots 35 and which slots are externally covered by plates 42.

The tongue member 31 is provided with a pair of cylindrical track members 43 for the said cushion member 41.

Having set forth the detailed construction of the improved ground leveling implement, the operation thereof is as follows:

The implement is secured as by the means 34 to the tractor T, or other suitable power propelling means. The cleaner blade 27 is lowered into engagement with the roller 23 and the tongue member is suitably adjusted for a purpose following.

At this point it is to be observed that the lower edges of wheels 15, roller 23 and wings 21 are substantially in a plane, as is evidenced in Fig. 3.

If the implement therefore is heavy with loose dirt and the tractor is required to pull hard in order to tow the implement, the tongue member 31 is caused to assume an almost horizontal position which tends due to the hard pull on the implement to raise the front end thereof with an attendant raising of the scrapers 17 and 18. When the pull on the tractor becomes heavy because of the accumulation of loose dirt in front of the scraper blades, the front end of the leveling implement raises upwardly because the tongue member is pivotally connected in any one of the three vertically aligned openings 32. In other words, the tractor connection between the leveling implement and the tractor allows for the gradual self clearance of an excess accumulation of loose dirt before the scraper blades. This action also results in the dirt filling holes or depressions because the scraper blade is not permitted to drop, by the cooperation of 32 and 43 pushing against 41 as adjusted by 38.

Through the adjusting screw shank 38 the initial bite of the scraper blade of the leveling implement can be adjusted and the self clearance feature set out in the preceding paragraph self operates on an overload of loose dirt before the scraper blades.

In a field where the ground or soil is of lighter and loose character, there is considerably less pull on the implement and the scrapers are easily kept at a constant level, and the hitch arrangement may be suitably set by the operator.

The above disclosed ground leveling implement has been in actual operation and same has been found to be capable of leveling a 90 acre field in a single normal work day.

Having set forth my invention in accordance with a single preferred structural embodiment thereof, what I claim and desire to secure by U.S. Letters Patent is:

1. A ground leveling implement comprising a frame including opposed side members having substantially spaced rear ends and tapering therefrom to the front end of the frame, a tongue supported by the front end of the frame, a pair of parallel laterally disposed tandem scraping members disposed intermediate the front and rear ends of the frame, said scraping members comprising a pair of channel members and a scraping blade secured to one of said channel members and extending below the same, a roller rotatably supported by the rear ends of said side members, and a pair of supporting wheels disposed between said scraping members and said roller supported by each of said side members.

2. The structure according to claim 1, together with a vertically disposed ground retaining apron projecting upwardly from the rearmost of said channel members and extending throughout the length thereof.

3. The structure according to claim 1, wherein said frame further includes a pair of intersecting frame members having their ends secured to said side members between said scraping members and said roller, and said pairs of wheels being disposed at opposite sides of the intersection of said last frame members.

4. The structure according to claim 1, wherein the front ends of said frame side members include laterally spaced parallel portions, relatively short channel members disposed below said portions and jointly therewith providing a vertical channel in which the rear end portion of said tongue is movably disposed, means on said side members to which the rear end of said tongue is pivotally connected, and adjustable means supported by said spaced parallel frame portions operative to limit vertical movement of said tongue about said pivotal connection thereof.

5. The structure according to claim 4, wherein said adjustable means comprise laterally aligned vertical slots in said parallel frame portions and said relatively short channel members, an elongated cushion member having its opposite ends movably disposed in said slots, and being engageable with said tongue, and a vertically disposed adjusting screw threadedly engaged with said parallel frame portions and swively connected to said cushion member.

6. A ground leveling implement including opposed side members having substantially spaced rear ends and tapering therefrom to the front of the frame, a tongue supported by the front of the frame, a pair of parallel laterally disposed tandem scraping members disposed intermediate the front and rear ends of the frame, a roller rotatably supported by the spaced rear ends of said frame members, a pair of supporting wheels disposed between said scraping members and said roller and supported by each of said side members, the parallel laterally disposed tandem scraping members being both confined by the same side wings.

7. The structure according to claim 1, wherein the individual wheels of the pair are supported on opposite ends of a rocker arm which arm intermediate its ends is pivotally connected to the respective side member.

8. The structure according to claim 1, wherein there is mounted over the roller a cleaner blade for the same, the blade being rigidly secured to one side of a channel member and said channel member at its opposite side being pivotally connected to said frame side members whereby the cleaner blade gravitates into cleaning engagement with said roller.

9. The structure according to claim 8, wherein said channel member is provided with a handle-like member at each end thereof and rotatable hook members on said frame for engaging said handle-like members and holding said cleaner blade out of engagement with said roller.

References Cited in the file of this patent

UNITED STATES PATENTS

| | | |
|---|---|---|
| 1,278,382 | Prendergast | Sept. 10, 1918 |
| 1,740,841 | Smith | Dec. 24, 1929 |
| 2,003,186 | Glassner | May 28, 1935 |
| 2,459,591 | Shumaker et al. | Jan. 18, 1949 |
| 2,488,187 | Haberman | Nov. 15, 1949 |
| 2,513,129 | Allison et al. | June 27, 1950 |
| 2,732,640 | Kirchner | Jan. 31, 1956 |

FOREIGN PATENTS

| | | |
|---|---|---|
| 460,573 | Canada | Oct. 25, 1949 |